Figure 1:
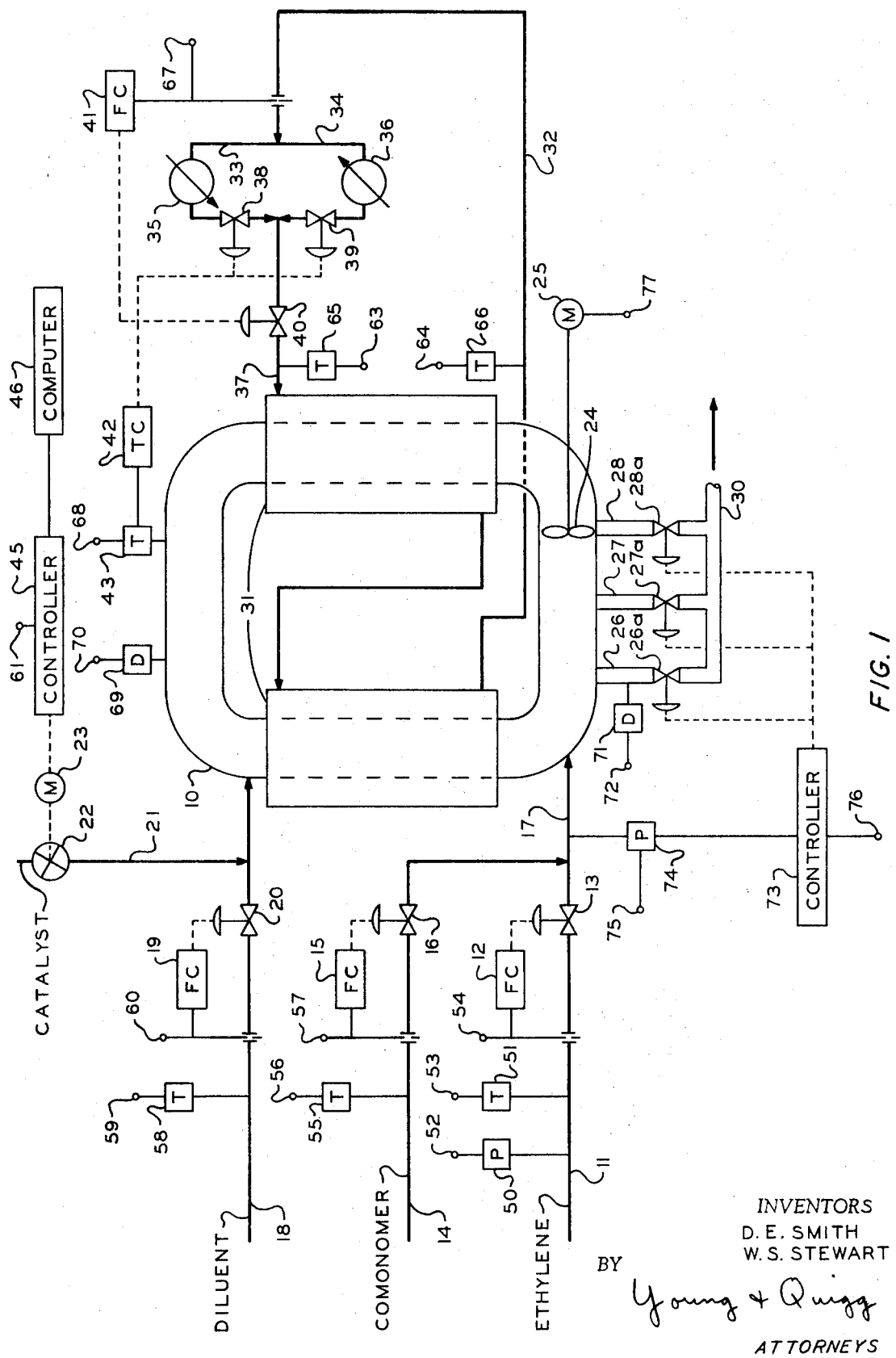

United States Patent

Smith et al.

[15] 3,636,326
[45] Jan. 18, 1972

[54] CONTROL SYSTEM FOR POLYMERIZATION REACTORS

[72] Inventors: Dexter E. Smith; William S. Stewart, both of Bartlesville, Okla.

[73] Assignee: Phillips Petroleum Company

[22] Filed: July 24, 1970

[21] Appl. No.: 58,041

[52] U.S. Cl. .................. 235/151.12, 260/94.9 P, 260/95, 318/610
[51] Int. Cl. .................. G06g 7/58, G05b 11/42, B01j 9/00
[58] Field of Search .................. 235/151, 12; 318/609, 610; 260/94.9 P

[56] References Cited

UNITED STATES PATENTS 3,078,265  2/1963  Berger et al.................235/151.12 X
3,533,236  10/1970  Cottington....................318/609 X Primary Examiner—Eugene G. Botz
Attorney—Young & Quigg

[57] ABSTRACT

The flow of catalyst to a polymerization reactor is controlled in response to a computation of the polymer production rate. A signal representative of the computed production rate is passed through a gated derivative controller and divided by a signal representative of the catalyst productivity. The quotient is employed to modify the computer production rate control signal.

6 Claims, 2 Drawing Figures

CONTROL SYSTEM FOR POLYMERIZATION REACTORS

In many chemical operations it is desirable to carry out reactions at substantially uniform rates in order to produce specification products at minimum operating costs. One such example occurs in the production of olefin polymers in continuous reactors with fresh catalyst being added as may be required. In such a system it is often difficult to control the rate of catalyst introduction so that polymerization takes place at a uniform rate. This is due in part to the fact that catalyst poisons may be present in varying amounts in one or more of the feed streams supplied to the reactor. In addition, some types of catalysts do not immediately produce polymer when introduced into a reactor. A certain induction period must be overcome before the full production rate is established. While various types of automatic control systems have been devised for use with reactors of this type, it is still difficult to maintain polymer production at uniform rates.

In accordance with one aspect of this invention, an improved control system is provided which can utilize a gated derivative mode of control. As applied to the control of a polymerization reaction, for example, the basic control is based on a computation of the production rate within the reactor. The output signal from the production rate computer is utilized to regulate the introduction of fresh catalyst into the reactor. The gated derivative control mode of this invention is employed to compensate for a rate of change of reaction being above a critical value or above a desired percentage of the production rate set point value. This gated derivative mode of control serves to adjust the catalyst introduction rate so as to maintain a uniform production rate of polymer. In another aspect of this invention, an improved control system for a polymerization process is provided.

In the accompanying drawing:
FIG. 1 is a schematic representation of a polymerization reaction system having the control system of this invention incorporated therein.

Figure 2:
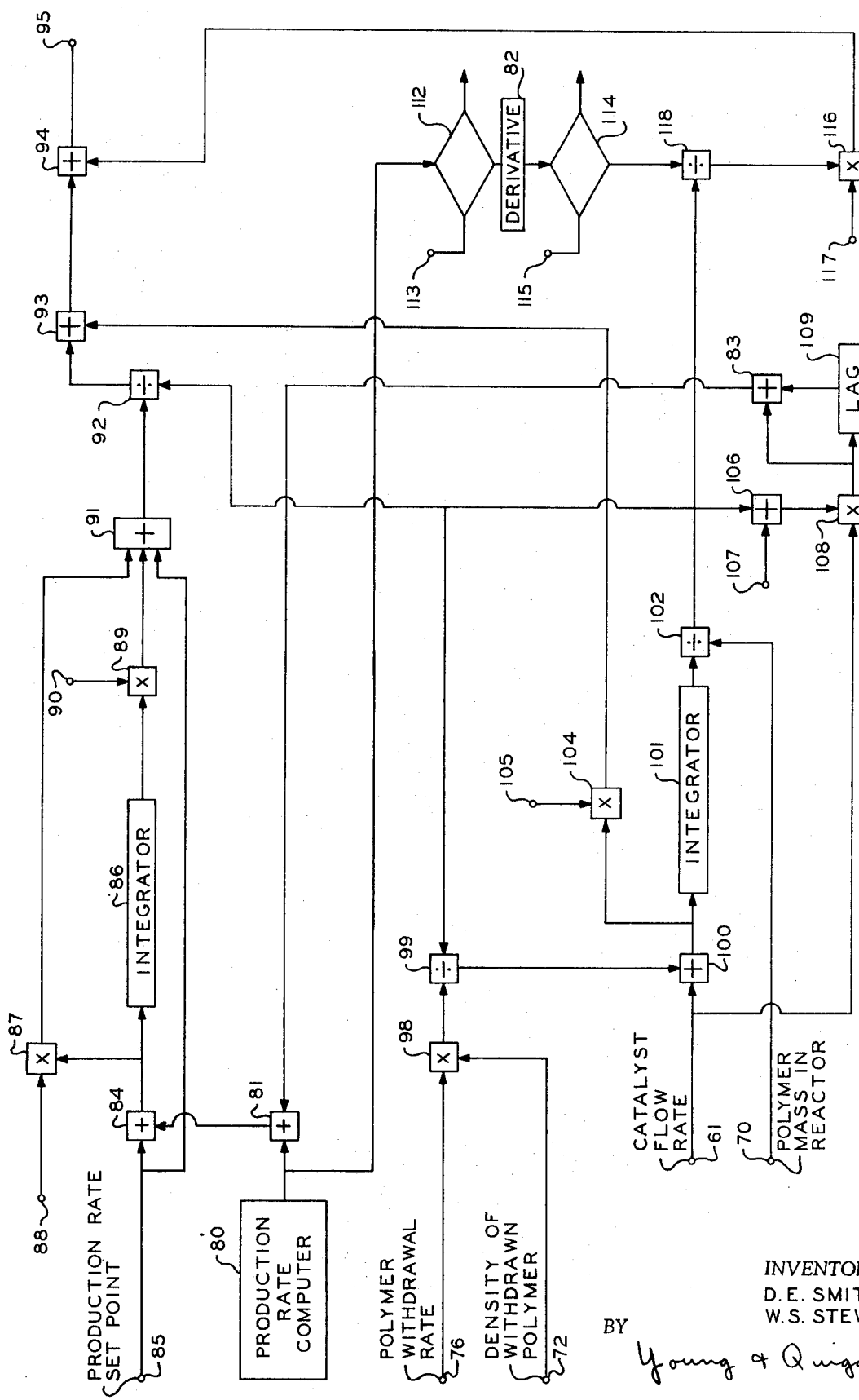

FIG. 2 is a schematic drawing of the computer employed in the control system of FIG. 1.

Referring now to the drawing in detail and to FIG. 1 in particular, there is shown a conventional reactor 10 which is employed to produce olefin polymer. In the specific embodiment to be described, a copolymer of ethylene with another olefin, such as hexene-1, is produced by a process of the type described in U.S. Pat. No. 2,825,721. Ethylene is introduced into reactor 10 through a conduit 11 which has a flow controller 12 associated therewith to adjust a valve 13. The ethylene is thus introduced at a predetermined rate in accordance with a set point value applied to controller 12. A comonomer, such as hexene-1, is introduced through a conduit 14 which has a flow controller 15 associated therewith to adjust a valve 16. Conduits 11 and 14 join a common conduit 17 which communicates with reactor 10. A diluent, such as isobutane or normal butane, is introduced through a conduit 18 which has a flow controller 19 associated therewith to regulate a valve 20. Catalyst is introduced through a conduit 21 which has a control element 22 therein. Control element 22 can be a rotatable valve which introduces a catalyst slurry into the system in increments, the rate of catalyst introduction being controlled by the speed of rotation of a motor 23 which actuates valve 22. This controls the dump frequency of the valve.

Reactor 10 is provided with an impeller 24 which is rotated by a motor 25 to circulate the contents of the reactor around a closed loop. The produced polymer settles into a plurality of takeoff legs 26, 27 and 28 which have respective control valves 26a, 27a and 28a therein. Conduits 26, 27 and 28 communicate at their downstream ends with a product removal conduit 30. Reactor 10 is provided with jackets 31 through which a heat-exchange fluid is circulated. The polymerization is an exothermic reaction so that it is usually necessary to pass a coolant through the jacket to remove heat. This coolant flows in a closed path which includes a withdrawal conduit 32 having a pump, not shown, therein. Conduit 32 communicates with parallel conduits 33 and 34 which have a cooler 35 and a heater 36, respectively, therein. The two parallel conduits join at a conduit 37 which introduces the fluid into jacket 31. Control valves 38, 39 and 40 are positioned in respective conduits 33, 34 and 37. Valve 40 is controlled by a flow controller 41 which maintains a constant flow of coolant through the system. Valves 38 and 39 are regulated by a temperature controller 42 which responds to a temperature transducer 43 that measures temperature within the reactor. Valves 38 and 39 operate in opposition to control the relative flows through cooler 35 and heater 36. The temperature of the heat-exchange fluid is thus regulated to tend to maintain a constant temperature within the reactor, as sensed by transducer 43.

In accordance with one embodiment of this invention, the rate of introduction of catalyst into the reactor is adjusted by a motor speed controller 45 which receives a signal from a computer 46. The output signal from computer 46 serves to adjust the speed of motor 23, and thus the rate of catalyst addition. As described in greater detail hereinafter, computer 46 receives a plurality of input signals which represent variables of the reaction system of FIG. 1. Computer 46 includes a production rate computer which computes the rate of polymer production in response to a measurement of the heat of polymerization. To this end, computer 46 receives signals which represent variables of the system. A pressure transducer 50 and a temperature transducer 51 measure the pressure and temperature of the ethylene in conduit 11 and establish signals at respective terminals 52 and 53 representative of these conditions. These signals are applied to computer 46. Similarly, a signal is established at a terminal 54 which represents the volumetric rate of flow of ethylene through conduit 11. A temperature transducer 55 establishes a signal at a terminal 56 which is representative of the temperature of the liquid comonomer. A signal is established at terminal 57 which represents the volumetric rate of flow of the comonomer. If this comonomer is present as a gas, a pressure transducer is also employed. In similar fashion, a temperature transducer 58 establishes a signal at a terminal 59 which represents the temperature of the diluent. A signal is established at a terminal 60 which represents the volumetric flow of diluent. A signal representative of the output of controller 45 is established at a terminal 61. This signal represents the speed of rotation of motor 23 and thus the actual rate of catalyst addition.

Signals representative of the temperatures of the heat exchange fluid entering and leaving jacket 31 are established at terminals 63 and 64 by respective temperature transducers 65 and 66. A signal representative of the rate of flow of coolant is established at a terminal 67. The output signal of temperature transducer 43 is applied to a terminal 68. A density-measuring device 69 is associated with reactor 10 to establish an output signal at a terminal 70 which is representative of the density of the material within the reactor. This density measuring device can be a gamma ray detector, for example. The attenuation of a stream of gamma rays passed through the reactor from a source, not shown, is thus a function of the density of the material within the reactor. Similarly, a density-measuring device 71 establishes a signal at a terminal 72 which is representative of the density of the polymer slurry collected in settling leg 26, from which the polymer concentration is readily calculated by suitable calibration of the meter. The rate of withdrawal of polymer from the reactor is regulated by a controller 73 which operates valves 26a, 27a and 28a in response to a measurement of the pressure of the monomer near the introduction point into the reactor. Controller 73 can operate the dump valves in sequence. A pressure transducer 74 establishes a signal at terminal 75 which is representative of this measured pressure. Controller 73 establishes a signal at a terminal 76 which is representative of the actual rate of polymer slurry withdrawal. A signal is established at a terminal 77 which is representative of the power input of motor 25 and thus of the amount of energy imparted to the moving stream within reactor 10. From these input signals an overall heat balance can be made and the polymer formation rate can be calculated.

Many of the output signals from the system of FIG. 1 are applied to a production rate computer 80 which is shown in FIG. 2. This computer establishes an output signal which is representative of the rate of production of polymer within reactor 10. Such a computer can conduct a heat balance computation and can be of the type described in U.S. Pat. Nos. 2,974,017 and 3,078,265, for example. The output signal from computer 80 is applied to a summing device 81 and to the input of a differentiating device 82. The second input signal to summing device 81 is obtained from a summing device 83, as described hereinafter. The output signal from device 81 is applied to the first input of a summing device 84. A reference signal representative of the desired production rate of polymer within reactor 10 is applied from an input terminal 85 to the second input of device 84. The output of summing device 84 is applied to the input of an integrator 86 and to the first input of a multiplier 87. A constant signal 88 constitutes the second input to multiplier 87. The output of integrator 86 is applied to the first input of a multiplier 89. A constant signal 90 constitutes the second input to multiplier 89. The output signals from multipliers 87 and 89 and set point signal 85 are applied to the three inputs of a summing device 91. The output signal from device 91 is applied as the numerator to a signal divider 92. The output signal from divider 92 is applied to the first input of a summing device 93. The output of device 93 is applied to the first input of a summing device 94. The output of device 94 is applied to an output terminal 95. The signal of terminal 95 is applied as the input to controller 45 of FIG. 1.

A signal representative of the polymer withdrawal rate from the reactor is applied from terminal 76 to the first input of a signal multiplier 98. As previously mentioned, the signal applied to terminal 76 represents the rate of withdrawal of polymer slurry through the settling legs. Terminal 72 is connected to the second input of multiplier 98. The signal applied to terminal 72 is representative of the density of the polymer slurry withdrawn through the settling legs, thereby its polymer concentration. The output signal from multiplier 98 is thus representative of the mass rate of polymer withdrawal from the reactor. This signal is applied as the numerator to a signal divider 99. The signal at terminal 61, which is representative of the catalyst flow rate into reactor 10, is applied to the first input of a summing device 100. The output of divider 99, which is representative of catalyst effluent rate, is connected to the second input of device 100. The output signal from device 100 is applied to the input of an integrator 101. The output of the integrator is applied as the denominator to a signal divider 102. The signal representative of the polymer mass within reactor 10 is applied from terminal 70 as the numerator to divider 102. This signal is obtained from the density-measuring device 69, the output of which is calibrated to represent the mass of polymer within the reactor or as a basis for calculating the mass of polymer within the reactor. The output signal from divider 102 is applied as the denominator to signal divider 92. This same signal, which represents the catalyst productivity $\left(\frac{\text{lb. polymer}}{\text{lb. catalyst}}\right)$, is also applied as the denominator to divider 99. The output signal from summing device 100 is also applied to the first input of a multiplier 104. A constant signal 105 constitutes the second input to multiplier 104. The output signal from multiplier 104, which represents the rate of catalyst accumulation within the reactor, is applied to the second input of summing device 93.

The output signal from divider 102 is applied to the first input of a summing device 106. A constant signal 107 constitutes the second input to device 106. The output of summing device 106 is applied to the first input of a multiplier 108. Terminal 61 is connected to the second input of multiplier 108. The output signal from multiplier 108 is connected directly to the first input of a summing device 83 and through a lag means 109 to the second input of summing device 83. As previously mentioned, the output of device 83 is connected to summing device 81.

The output signal from production rate computer 80 is applied to the input of signal comparing means 112. A constant signal 113 is connected as the second input to comparing means 112. The first output of comparing means 112 is removed from the circuit, while the second output is connected to the input of differentiating device 82.

The output signal from derivative device 82 is applied to the input of a signal-comparing means 114. A constant signal 115 is also connected to comparing means 114. The first output of comparing means 114 is removed from the circuit, while the second output is connected as the numerator to a signal dividing means 118. The output signal from divider 102 is applied as the denominator to a divider 118. The output of divider 118 is connected to the first input of a signal multiplier 116. A constant signal 117 constitutes the second input of multiplier 116. The output of multiplier 116 is connected to summing device 94.

As previously mentioned, the control system is utilized to maintain the production rate as nearly uniform as possible. The signal from production rate computer 80 is the basic control signal which regulates the rate of catalyst addition. The control elements including multiplier 87, summing device 84, integrator 86 and summing device 91 provide both proportional and integral modes of control. Device 84 compares the computed production rate with the desired production rate for a given system. Any difference between the two rates is applied through integrator 86 to device 91. Multipliers 87 and 89 are employed to incorporate suitable scale factors as may be required to maintain proper catalyst flow rates in a given system. The values of the various constant signals can be obtained by routine trial and error procedures to provide smooth and relatively accurate control in any given system.

Another factor involved in the control of catalyst introduction is the catalyst accumulation within the reactor. To this end, the output signal from multiplier 98 is representative of the mass rate of withdrawn polymer. As will become apparent, the output signal from divider 99 is representative of the flow of catalyst out of the reactor along with the polymer product. Catalyst is removed at a certain flow rate in this manner. This signal is subtracted from the flow of catalyst into the reactor by device 100 to obtain a signal representative of the rate of catalyst accumulation in the reactor. This signal is integrated by integrator 101. In divider 102, the mass of polymer within the reactor is divided by the accumulated catalyst to provide a signal representative of catalyst productivity. The quotient is the denominator in divider 99, thereby providing the previously mentioned output signal. The catalyst flow input signal from terminal 61 is multiplied by the output signal from divider 102, after having a constant inserted by device 106, and the product is transmitted through lag means 109. Lag means 109 and device 83 provide dead time compensation. As is well known, a change in catalyst flow does not immediately change the production rate. This compensation is inserted at device 81. Multiplier 108 and lag means 109 operate in the same general manner as the device described in U.S. Pat. No. 3,175,764. The output signal from summing device 91 is divided by the output signal from divider 102 to provide an adaptive feature of variable gain in the production rate control system.

The computed production rate signal from computer 80 is passed to comparing means 112. In some applications it is desirable to employ a noise filter between computer 80 and comparing means 112. The production rate signal is compared in means 112 with a lower limit signal 113. If the production rate signal is less than the lower limit, the resulting output is removed from the circuit and no further action is taken. If the computed production rate signal is greater than lower limit 113, it is passed through differentiating device 82 so that a signal representative of the derivative of the production rate with respect to time is passed to comparing means 114. This signal is therein compared with a lower limit signal 115. If the derivative signal is less than this lower limit 115, the resulting output is removed from the circuit and no further control action is taken. If the derivative signal is greater than the lower limit 115, the derivative signal is passed to divider 118 wherein it is divided by the output signal from divider 102. The quotient is passed through a scaling multiplier 116 to summing device 94. Thus, a derivative mode of control is added when both the production rate and its derivative are above respective limits. The foregoing example illustrates one of the several combinations of production rate limits and limits on magnitude and direction of change wherein a control action is taken. The computer of FIG. 2 can be constructed of conventional analog elements, either electrical or pneumatic, for example. As an alternative, the input signals can be converted to digital form and applied to a conventional digital computer which is programmed to perform the calculations illustrated in the drawing.

While this invention has been described in conjunction with presently preferred embodiments, it obviously is not limited thereto.

What is claimed is:

1. In a polymerization system which includes a reactor, means to introduce monomer into the reactor, means to introduce catalyst into the reactor, means to cool the reactor, and means to withdraw polymer from the reactor; a control system comprising:

means to compute the polymer production rate within the reactor and establish a first signal representative thereof;

means to compare said first signal with a constant signal representative of a predetermined production rate and establish a control signal representative of any difference therebetween;

first signal comparing means to compare said first signal with a predetermined first lower limit constant signal and to pass said first signal when it is greater than said lower limit constant signal;

derivative means responsive to the first signal passed by said first signal comparing means to establish a second signal representative of the derivative of said first signal;

second signal comparing means to compare a second signal passed by said first comparing means and derivative means with a predetermined second lower limit constant signal and to pass said second signal when it is greater than said second lower limit constant signal;

means to compute catalyst productivity within the reactor and establish a third signal representative thereof;

means to divide a second signal passed by said second comparing means by said third signal to establish a fourth signal representative of the quotient;

means to modify said control signal by said fourth signal to establish a fifth signal; and means responsive to said fifth signal to control the rate of catalyst introduction into said reactor.

2. The control system of claim 1 wherein said means to compute catalyst productivity comprises:

means to measure the rate at which polymer is withdrawn from the reactor and establish a sixth signal representative thereof;

means to establish a seventh signal representative of the density of the polymer withdrawn from the reactor;

means to multiply said sixth signal by said seventh signal and establish an eighth signal representative of the product;

means to measure the rate of catalyst flow into the reactor and establish a ninth signal representative thereof;

means to divide said eighth signal by said third signal and establish a tenth signal representative of the quotient;

means to subtract said tenth signal from said ninth signal and establish an eleventh signal representative of the difference;

means to integrate said eleventh signal to establish a twelfth signal representative of the catalyst within the reactor;

means to measure the amount of polymer within the reactor and establish a thirteenth signal representative thereof; and means to divide said thirteenth signal by said twelfth signal to establish said third signal.

3. The control system of claim 2 wherein said means to compare said fifth signal with a constant signal comprises means to multiply said third signal by said ninth signal and establish a fourteenth signal representative of the product;

means responsive to said fourteenth signal to establish a fifteenth signal representative of said fourteenth signal delayed by a predetermined amount;

means to sum said fourteenth and fifteenth signals and establish a sixteenth signal of the difference therebetween; difference therebetween;

means to sum said sixteenth signal and said first signal to establish a seventeenth signal; and means to compare said seventeenth signal with said constant signal to establish said control signal.

4. The control system of claim 1 wherein said means to modify comprises means to divide said control signal by said third signal and establish a sixth representative of the quotient; and means to combine said sixth signal with said fourth signal and establish said fifth signal representative of the resulting difference.

5. The control system of claim 4, further comprising means to establish a seventh signal representative of the rate of change of catalyst within said reactor; and means to compare said sixth signal with said seventh signal and establish a signal representative of the difference therebetween, said last-mentioned signal being compared with said fourth signal to establish said fifth signal.

6. The control system of claim 4 wherein said means to establish said control signal includes means to integrate said control signal, and means to sum said constant signal with the resulting integrated signal to establish said control signal.

* * * * *

UNITED STATES PATENT OFFICE

CERTIFICATE OF CORRECTION

Patent No. 3,636,326      Dexter E. Smith et al      Dated: January 18, 1972

It is certified that error appears in the above-identified patent and that said Letters Patent are hereby corrected as shown below:

Column 6, line 30, "representative" has been omitted following "signal";
              line 31, "difference therebetween;" has been added following "therebetween;"
              line 38, "signal" has been omitted following "sixth".

Signed and sealed this 18th day of July 1972.

(SEAL)
Attest:

EDWARD M. FLETCHER, JR.      ROBERT GOTTSCHALK
Attesting Officer               Commissioner of Patents